Figure 1:
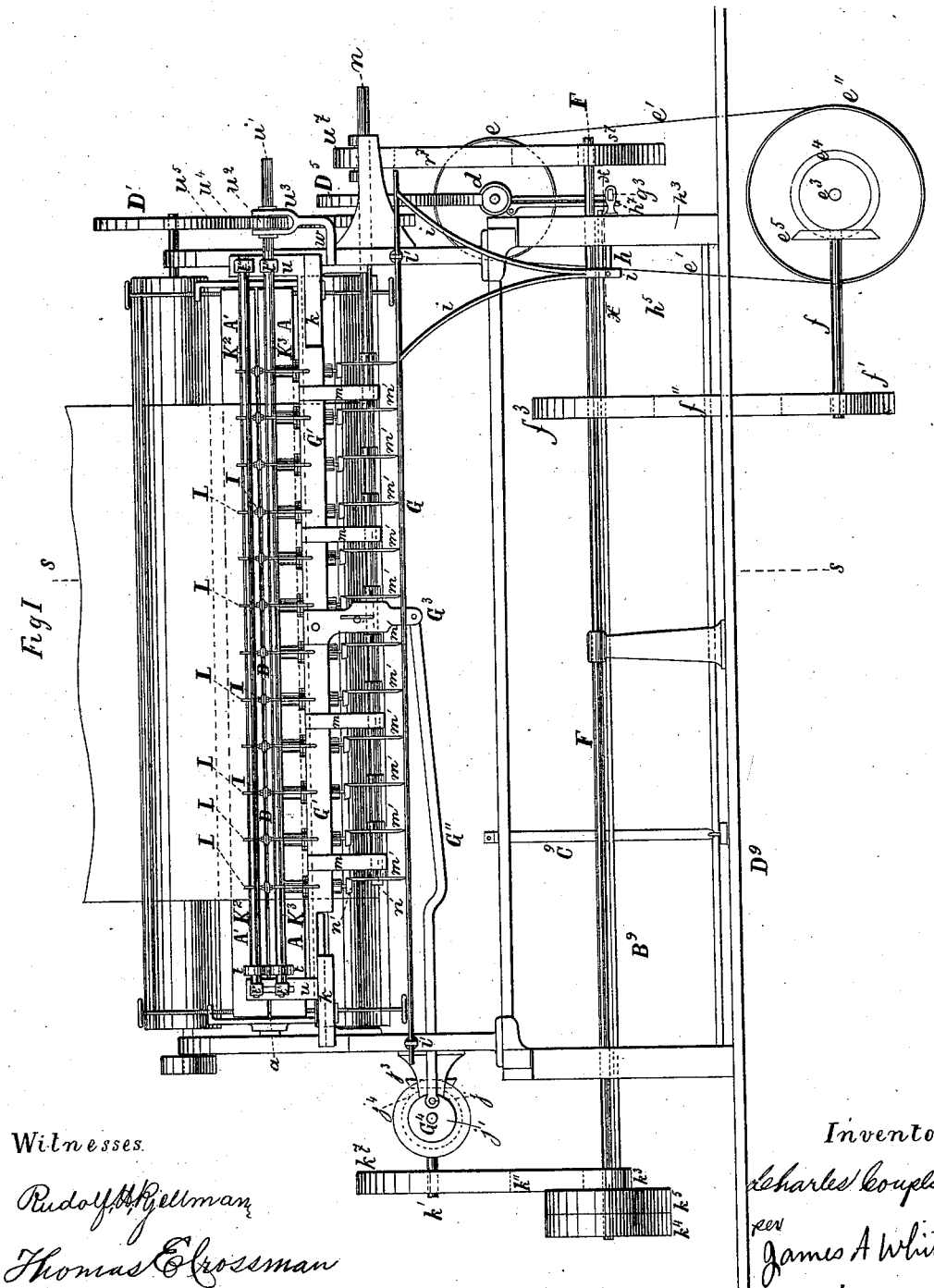

(No Model.) 10 Sheets—Sheet 1.

C. COUPLAND.
MACHINE FOR CUTTING DOUBLE PILE FABRICS.

No. 294,970. Patented Mar. 11, 1884.

Witnesses.
Rudolf H Kjellman
Thomas E Crossman

Inventor
Charles Coupland
per
James A Whitney
Attorney (No Model.)

C. COUPLAND.

MACHINE FOR CUTTING DOUBLE PILE FABRICS.

No. 294,970. Patented Mar. 11, 1884.

Witnesses
Rudolf A. Kjellman
Thomas E. Krossman

Inventor
Charles Coupland
per James A. Whitney
Attorney (No Model.) 10 Sheets—Sheet 3.

C. COUPLAND.
MACHINE FOR CUTTING DOUBLE PILE FABRICS.

No. 294,970. Patented Mar. 11, 1884.

Witnesses
Rudolf Fjellman
Thomas E. Croseman

Inventor
Charles Coupland
per James A. Whitney
Attorney

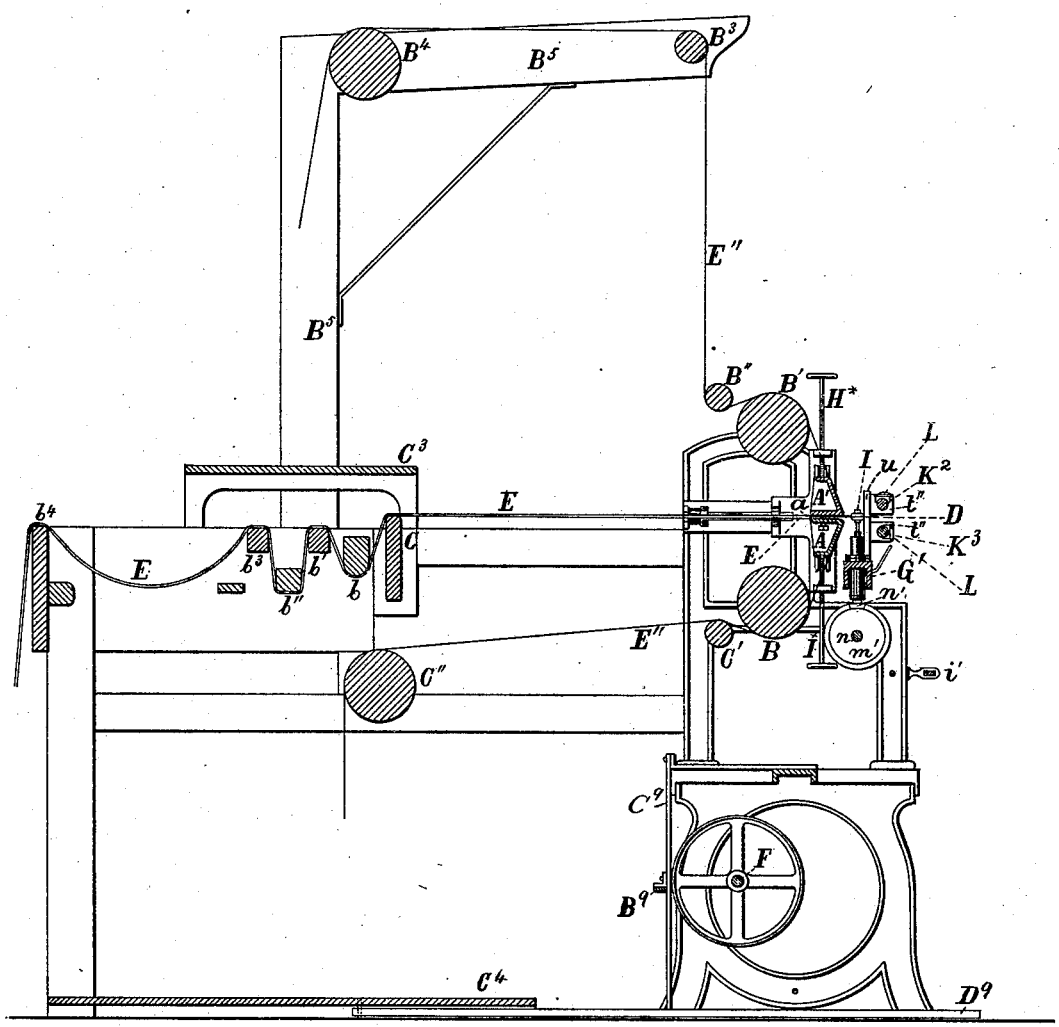

(No Model.)  
10 Sheets—Sheet 5.
C. COUPLAND.
MACHINE FOR CUTTING DOUBLE PILE FABRICS.
No. 294,970. Patented Mar. 11, 1884.
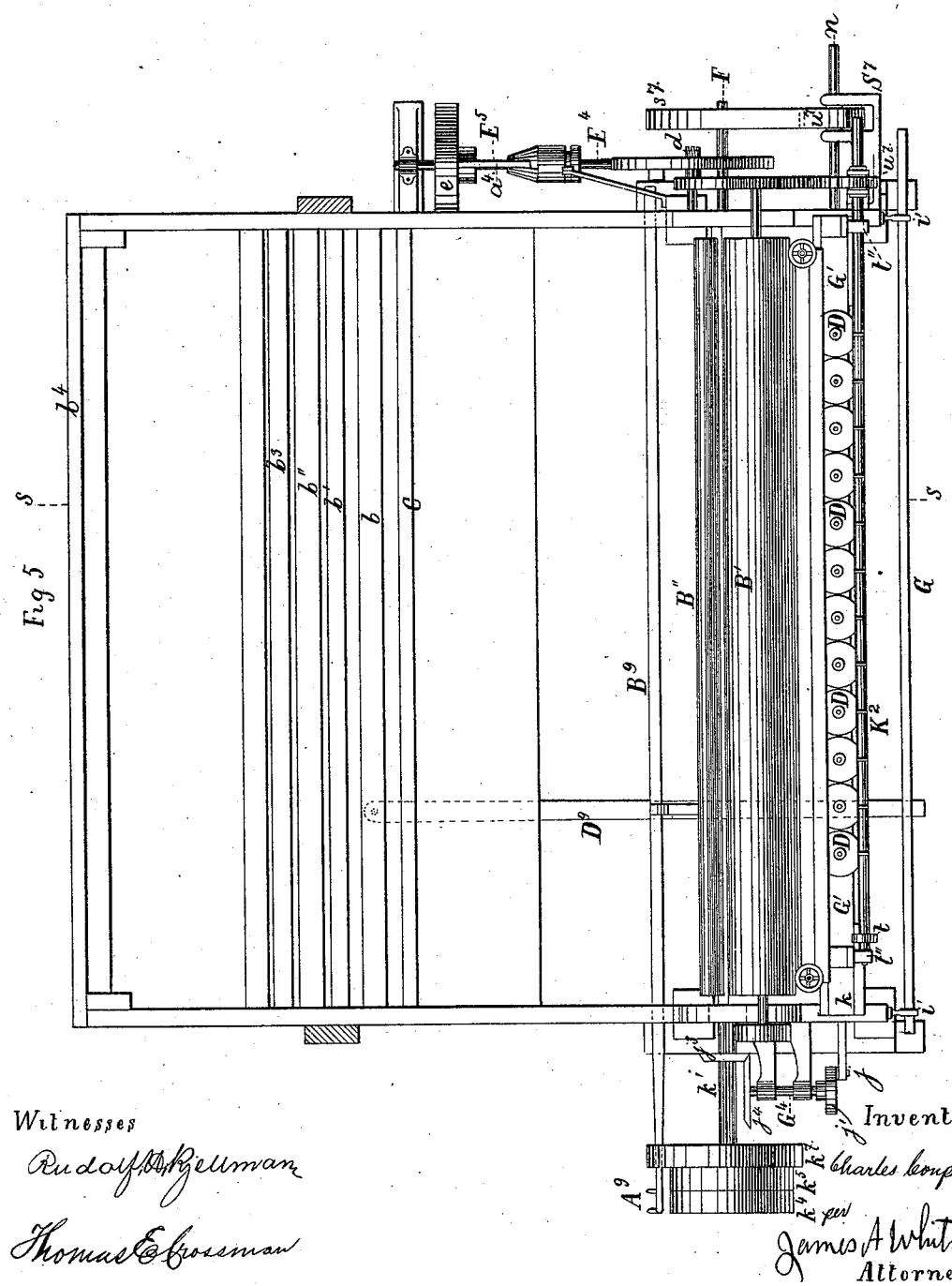

(No Model.) 10 Sheets—Sheet 6.
C. COUPLAND.
MACHINE FOR CUTTING DOUBLE PILE FABRICS.
No. 294,970. Patented Mar. 11, 1884.
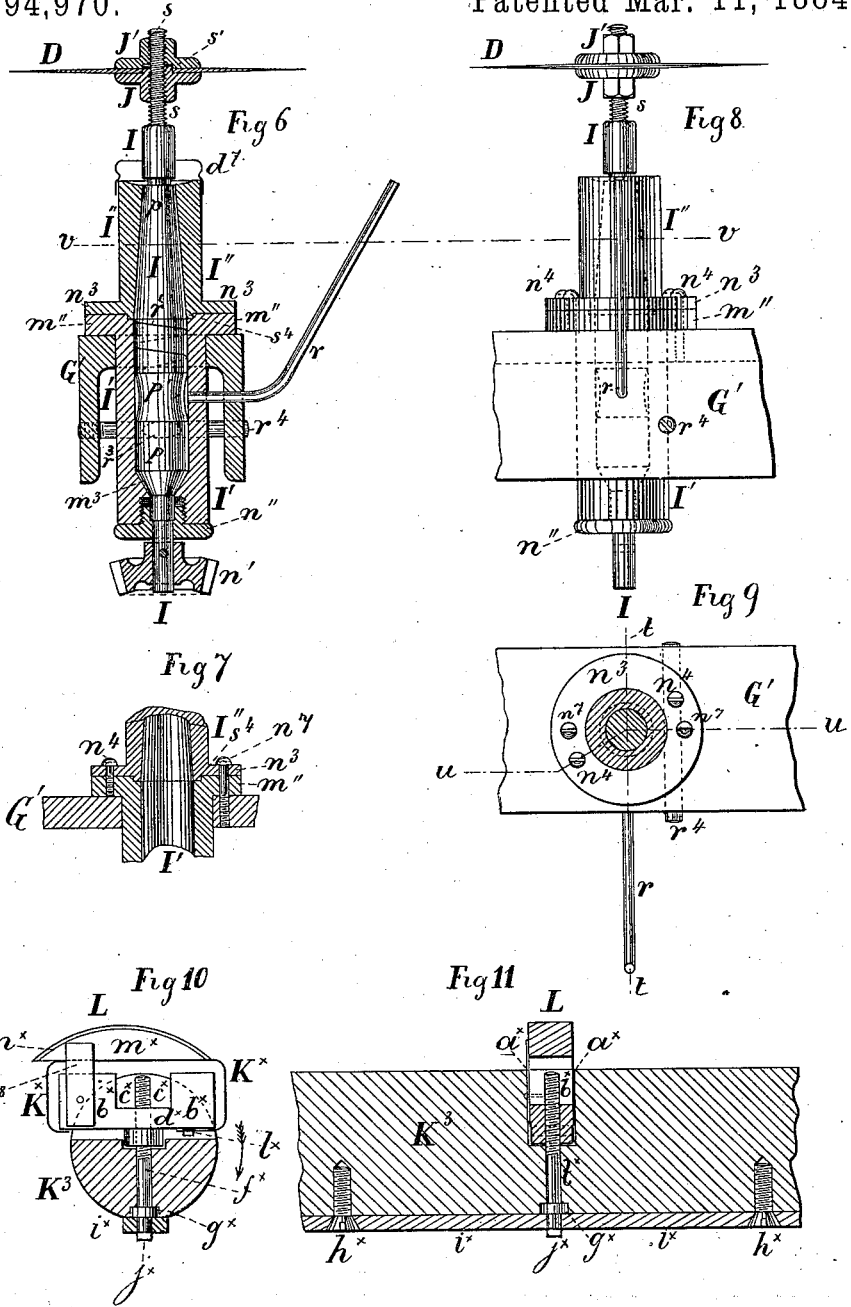
Witnesses
Rudolf A. Kjellman.
Thomas E. Crossman.
Inventor
Charles Coupland
per James A. Whitney
Attorney (No Model.) 10 Sheets—Sheet 7.

C. COUPLAND.
MACHINE FOR CUTTING DOUBLE PILE FABRICS.

No. 294,970. Patented Mar. 11, 1884.

Witnesses
Rudolph Kellman
Thomas E. Crouman

Inventor
Charles Coupland
per James A. Whitney
Attorney (No Model.) 10 Sheets—Sheet 8.
C. COUPLAND.
MACHINE FOR CUTTING DOUBLE PILE FABRICS.
No. 294,970. Patented Mar. 11, 1884.
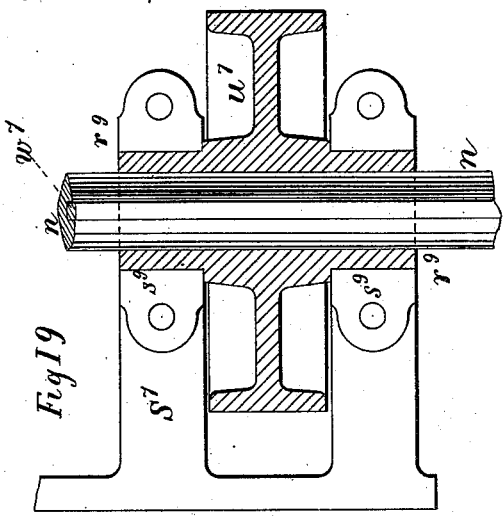
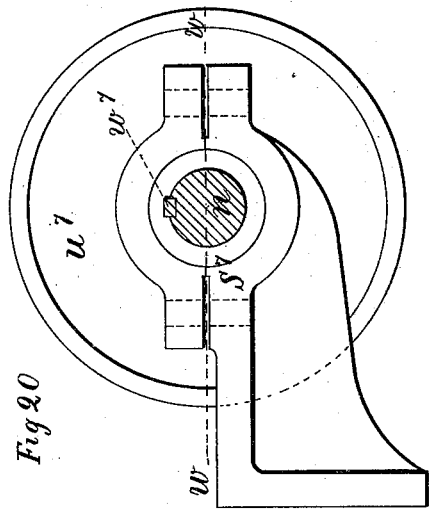
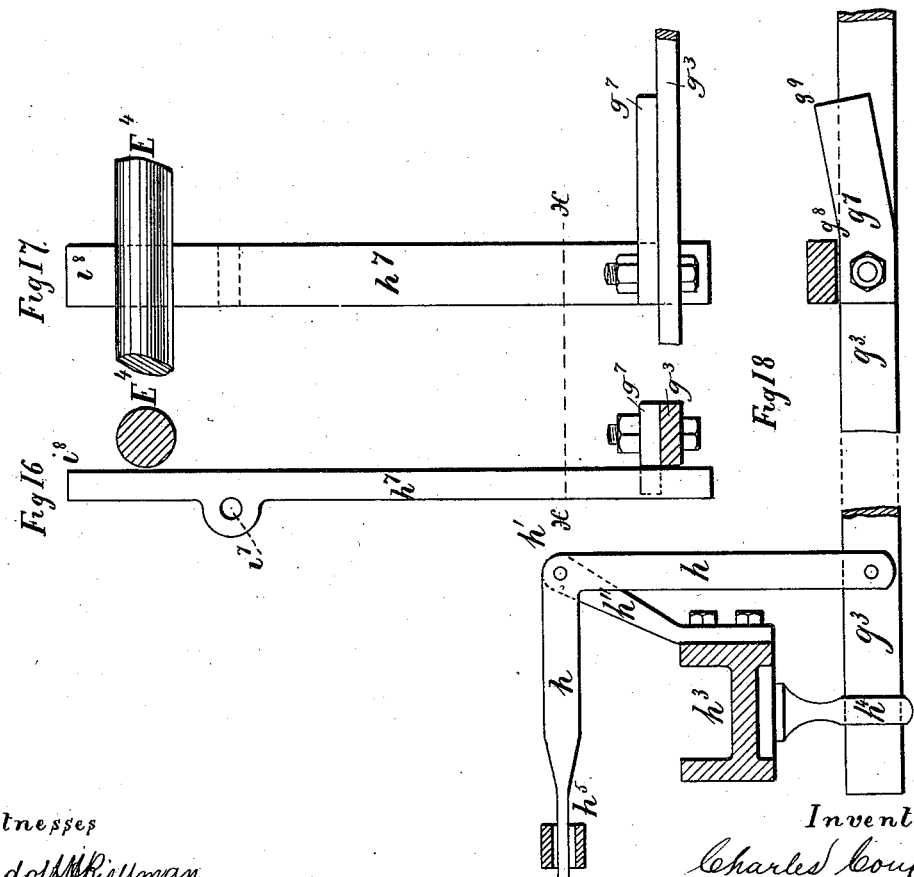
Witnesses
Rudolph Kjellman
Thomas E. Crossman
Inventor
Charles Coupland
per James A. Whitney
Attorney (No Model.) 10 Sheets—Sheet 9.
C. COUPLAND.
MACHINE FOR CUTTING DOUBLE PILE FABRICS.
No. 294,970. Patented Mar. 11, 1884.
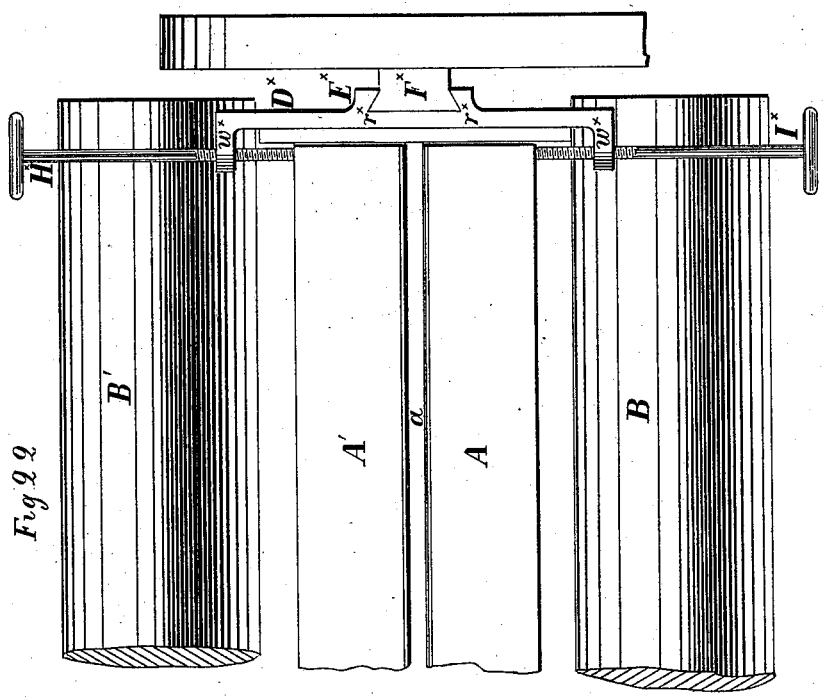
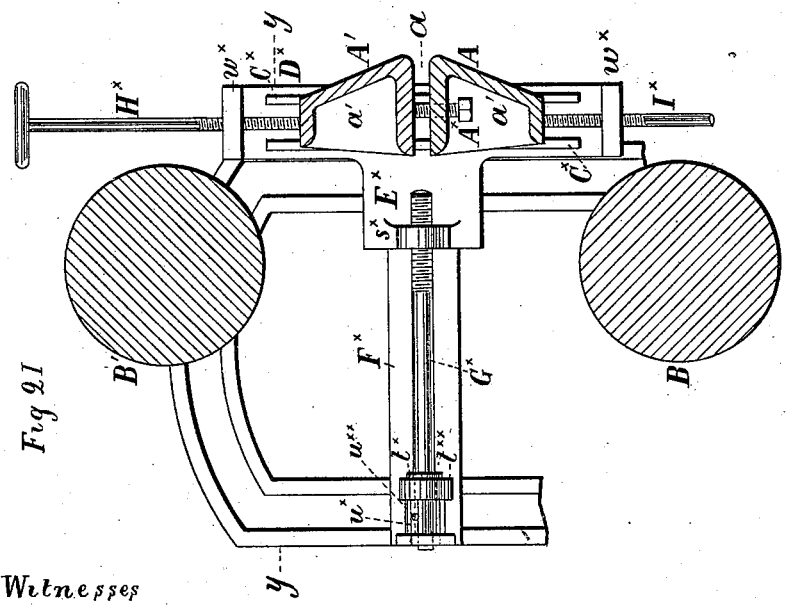
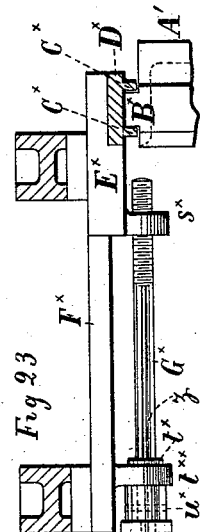
Witnesses
Rudolf H. Kjellman
Thomas E. Grossman
Inventor
Charles Coupland
per James A. Whitney
Attorney (No Model.) 10 Sheets—Sheet 10.
C. COUPLAND.
MACHINE FOR CUTTING DOUBLE PILE FABRICS.
No. 294,970. Patented Mar. 11, 1884.
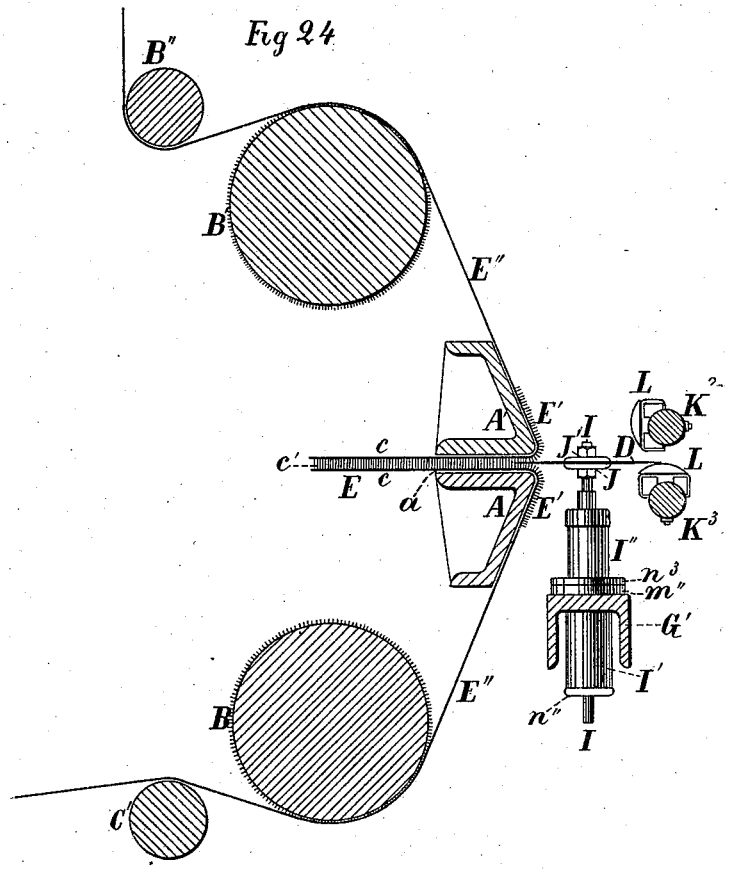
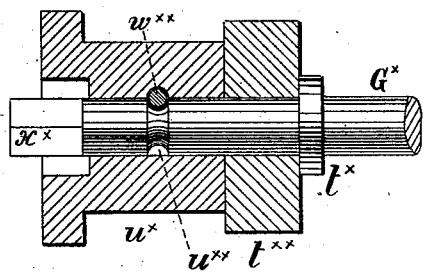
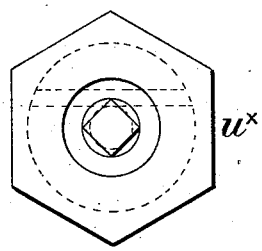
Witnesses
Rudolf H. Kjellman
Thomas E. Crossman
Inventor
Charles Coupland
per James A. Whitney
Attorney.

UNITED STATES PATENT OFFICE.

CHARLES COUPLAND, OF SEYMOUR, CONNECTICUT.

MACHINE FOR CUTTING DOUBLE PILE FABRICS.

SPECIFICATION forming part of Letters Patent No. 294,970, dated March 11, 1884.

Application filed November 7, 1882. (No model.)

*To all whom it may concern:*

Be it known that I, CHARLES COUPLAND, of Seymour, in the county of New Haven and State of Connecticut, have invented certain new and useful Improvements in Machines for Cutting Double Pile Fabrics; and I do hereby declare that the following is a full, clear, and exact description of the same.

This invention relates to that branch of the art of manufacturing pile fabrics in which a double fabric is first woven, such fabric being composed of two ground-webs connected by intermediate pile-threads extending from one ground-web to the other, so that by dividing the pile-threads midway between the two webs one-half thereof will be left projecting upon each of the divided parts, thereby constituting two separate pile or plush fabrics.

Heretofore it has been proposed to cut or divide the pile-threads, as aforesaid, by a single reciprocating circular cutter; but with such single cutter the operation is necessarily imperfect and unsatisfactory for many reasons. Among others, the entire work of cutting being thrown upon a single cutter, it is practically impossible, by means heretofore used in connection therewith, to keep the same sufficiently sharp, and consequently the dulled edge not only fails to properly sever the pile-threads, but by dragging thereon tends to fracture or tear the same, thereby spoiling the fabric. Further, such single cutter can only be used for very narrow fabrics, inasmuch as the cutter must traverse from edge to edge of the latter, and this long reciprocating movement is difficult to effect without jar and lack of uniformity of motion. Further, such single cutter, being required to perform all the work of severing the pile-threads, is necessarily slow in operation and proportionally expensive, and thus offers but few and slight advantages over other methods known for many years. It has been proposed to remedy the defects of this single-cutter arrangement by the use of two circular cutters placed side by side and applied in the same relation as the single cutter. This, however, was in practice but little, if any, better than the single cutter, being substantially the same in its operation, inasmuch as the two cutters required to traverse bodily from edge to edge of the fabric with a long stroke, which, for the reasons aforesaid, destroyed their efficiency. In my invention I employ a series or system of circular cutters, which extend substantially the width of the fabric, and the cutters of said series being operated with a relatively slight reciprocating movement, so that the whole or substantially the whole width of the fabric is subjected to the action of the cutters at one and the same time.

My invention is not only designed to obviate the defects inherent in the devices previously known, but also to insure other advantageous results in the manufacture of the double pile fabrics aforesaid; and my said invention comprises various new and useful means and combinations of parts, which, embraced in an apparatus for cutting pile-fabrics, render the same certain and rapid in operation, strong and durable in character, and capable of producing rapidly, and consequently cheaply, so far as concerns the operations of manufacture, pile fabrics of the most superior quality, my said new and useful means and combinations of parts being hereinafter more fully particularized in the claims.

Figure 2:
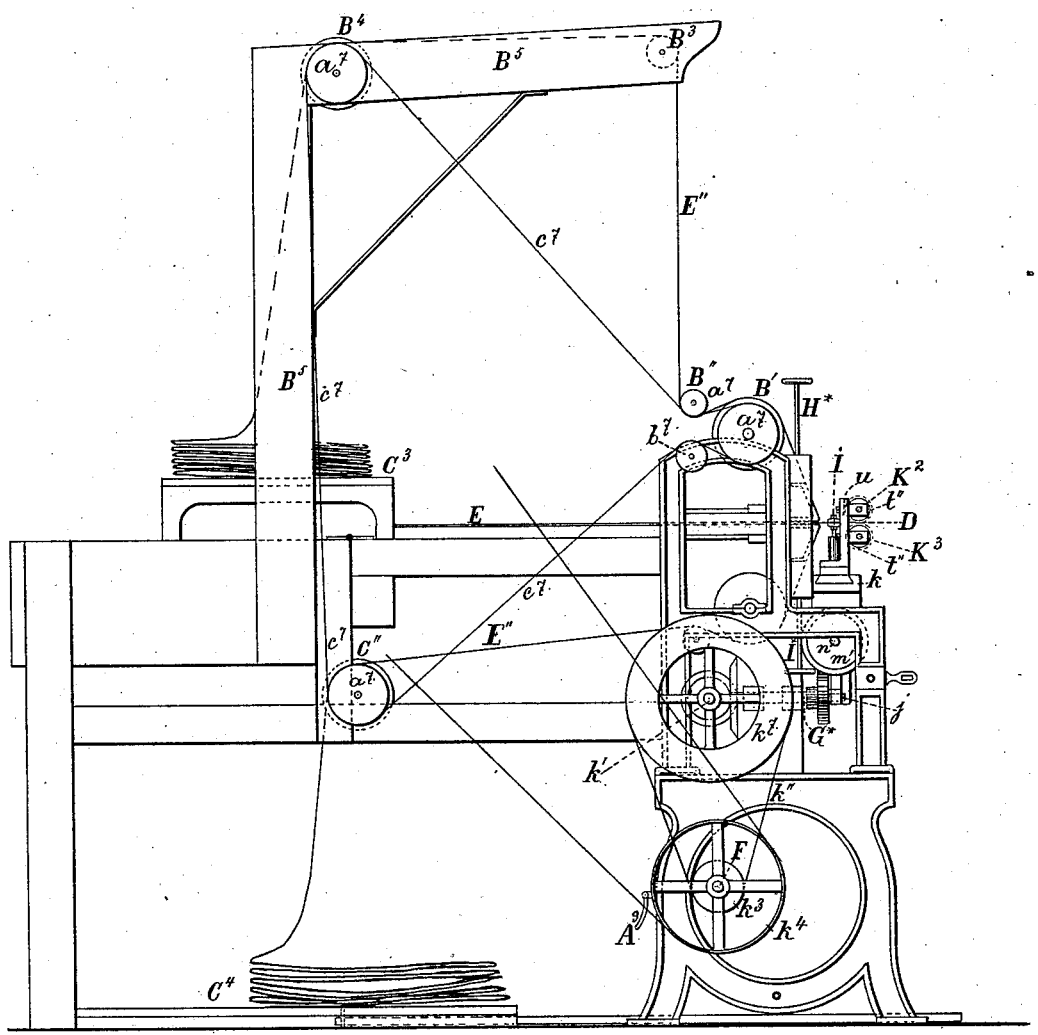
Figure 3:
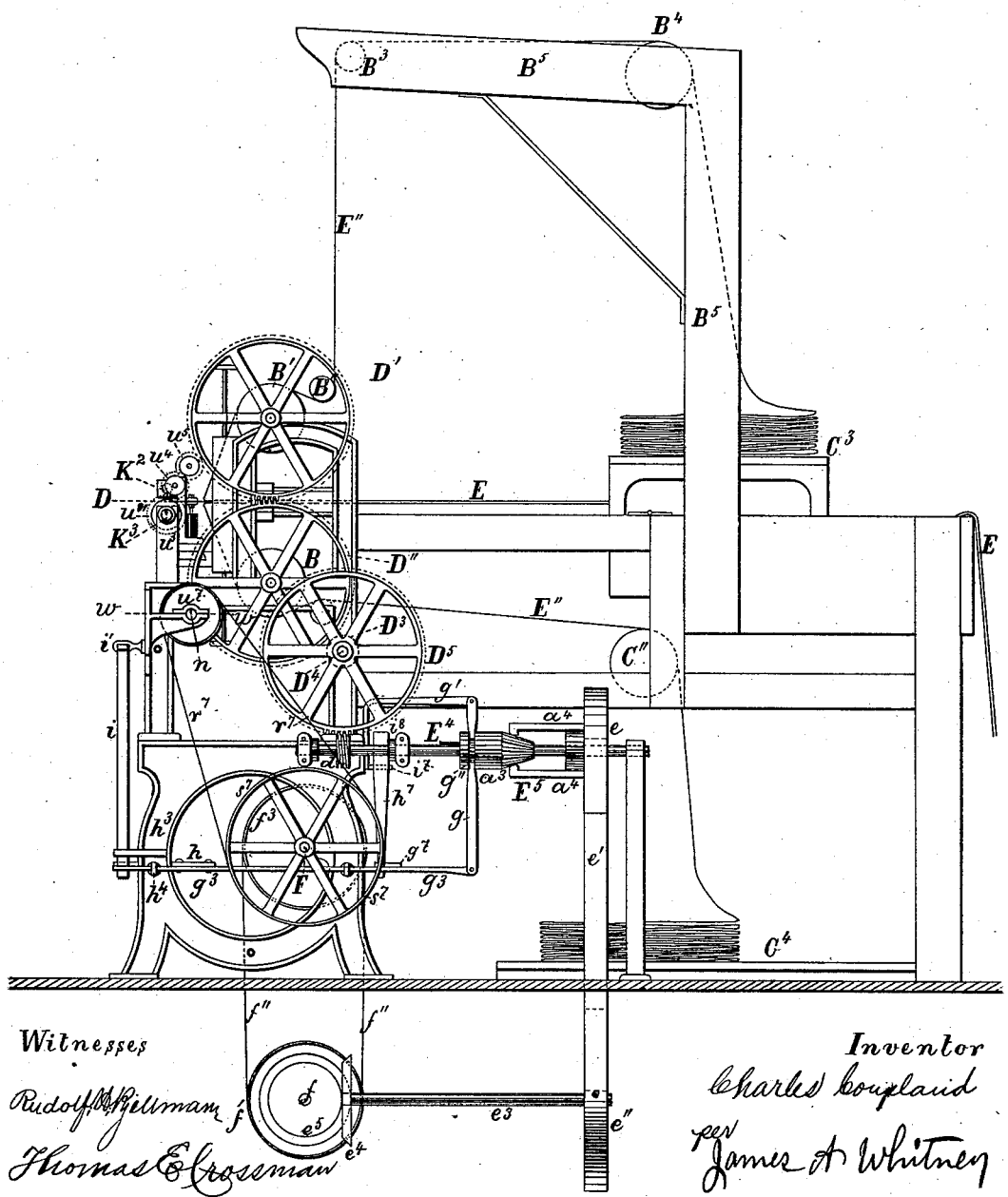
Figure 12:
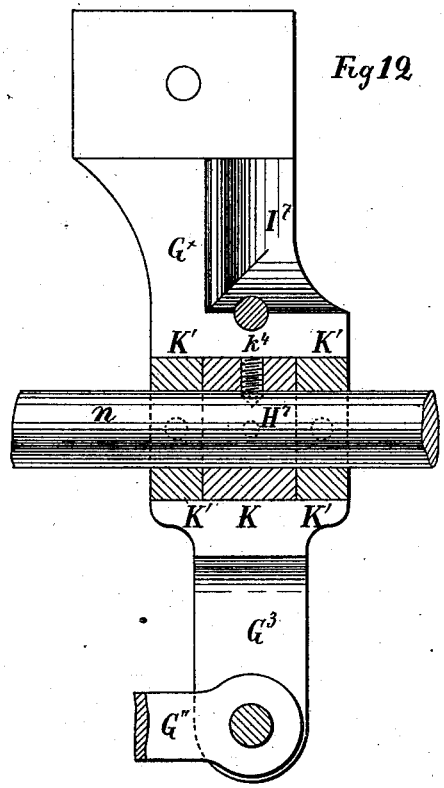
Figure 13:
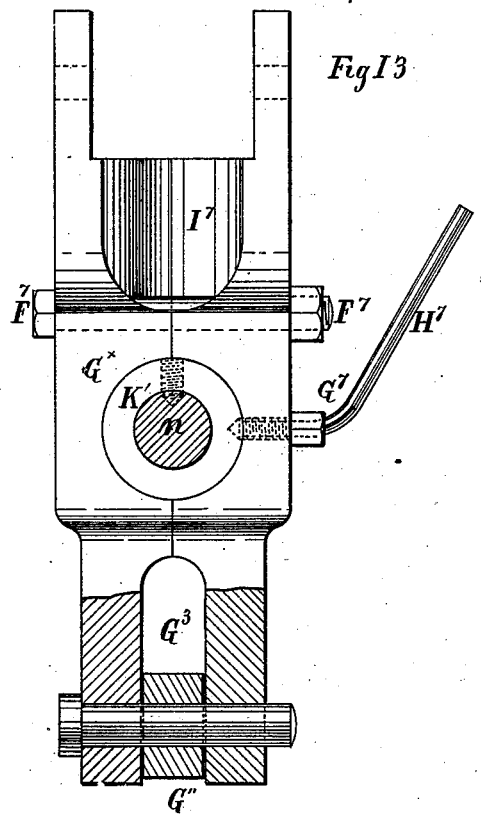
Figure 14:
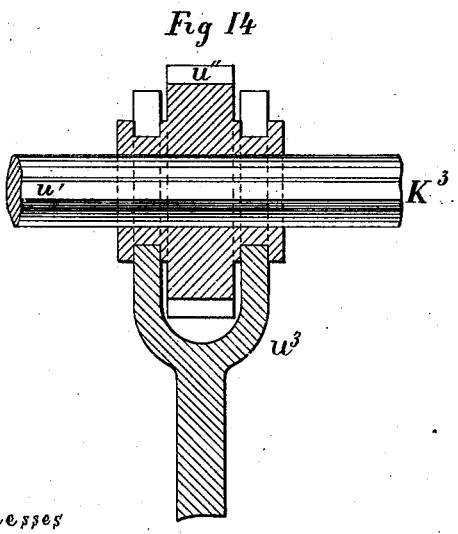
Figure 15:
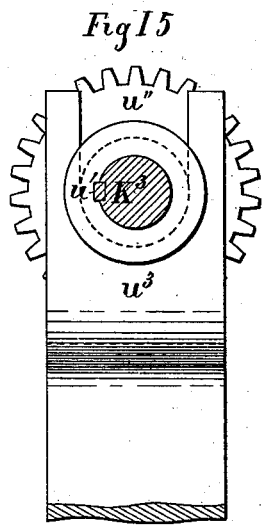

Figure 1 is a partial front elevation of a machine constructed according to my said invention. Fig. 2 is an end elevation of the same, as seen from the left-hand end of Fig. 1. Fig. 3 is an end elevation of the same, as seen from the right-hand end of Fig. 1. Fig. 4 is a vertical transverse sectional view taken in the line $s\ s$ of Figs. 1 and 5. Fig. 5 is a plan view and partial horizontal section of the machine. Fig. 6 is a detail sectional view on a larger scale, showing one feature of my said invention, and taken in the line $t\ t$ of Fig. 9, the spindle and oiling-tube included in said figure being, however, shown in elevation. Fig. 7 is a similar section of the same, taken in the line $u\ u$ of Fig. 9. Fig. 8 is a side view of the devices illustrated in Figs. 6 and 7, and Fig. 9 is a horizontal sectional view taken in the line $v\ v$ of Figs. 6 and 8. Fig. 10 is a transverse sectional view, illustrating another feature of my said invention; and Fig. 11 is a longitudinal sectional view of the parts illustrated in Fig. 10. Fig. 12 is a sectional view, taken in a direction longitudinal with the machine, of certain devices included in another feature of my said invention; and Fig. 13 is a side view, partly in section, of the same. Fig. 14 is a sectional view, illustrating certain devices comprised in another feature of my said invention; and Fig. 15 is a side view thereof, partly in section, taken in a plane at right angles to Fig. 14. Fig. 16 is a side view, partly in section, of certain mechanism included in my said invention, as seen from the left-hand end of Fig. 17. Fig. 17 is a side view of the devices shown in Fig. 16. Fig. 18 is a horizontal sectional view taken in the line $x\ x$ of Figs. 1, 16, and 17. Fig. 19 is a horizontal sectional view, showing certain mechanism embraced in another feature of my said invention, and taken in the line $w\ w$ of Figs. 3 and 20. Fig. 20 is a side view of the parts represented in Fig. 19. Fig. 21 is a vertical transverse sectional view, showing devices included in other features of my said invention, and taken in the line $s\ s$ of Fig. 1. Fig. 22 is a front view, illustrating the parts represented in Fig. 21. Fig. 23 is a horizontal sectional view of the parts represented in Figs. 21 and 22, and taken in the line $y\ y$ of Fig. 21. Fig. 24 is a vertical transverse sectional view, taken in the same line as Fig. 21, illustrating the manner in which the circular knives act in separating the two webs of the double pile fabric, and also illustrating the action of the sharpening devices upon the rotary cutters, by which the aforesaid separation is effected. Fig. 25 is a detail sectional view of parts included in a certain feature of my said invention, taken in the line $z\ z$ of Fig. 23, the screw-shaft included in said figure being, however, shown in elevation; and Fig. 26 is an end view of the parts represented in Fig. 25, as seen from the left-hand end of the latter.

A A' are two parallel straining-bars arranged at the front of the machine, and preferably in a horizontal position. These straining-bars are placed one above another, with a suitable intervening space, $a$, between. This space is made greater or less, as circumstances require, by adjusting one of the bars with reference to the other, as hereinafter explained. These straining-bars should be made of metal, and for lightness, and also for other reasons, may be hollowed at their inner or rearmost sides, as represented in Figs. 4, 21, and 24. Placed below and toward the rear of the lower straining-bar, A, is a roll, B, and above and toward the rear of the upper straining-bar, A', is a similar roll, B'.

B'' B³ B⁴ are guide-rollers, which in position are parallel with the roll B', but which are arranged in relation to the said rod B' as represented in Figs. 2, 3, and 4. C' and C'' are similar rollers, which in position are parallel with roll B, but which are arranged in relation to the said roll B as represented in the said Figs. 2, 3, and 4. The gudgeons or shafts of the rollers B'', B³, B⁴, C', and C'' are placed in suitable bearings provided on the frame of the machine, the rollers B³ and B⁴ being supported by standards B⁵, extending upward from the main portion of the frame, while the bearings of the rollers B'', C', and C'' are formed in the lower portion of the frame. The roll B' and rollers B'', B⁴, and C'' have, at one end of their respective shafts, pulleys, each of which is indicated by the reference-letter $a^5$ in Fig. 2. An idler or guide pulley of similar character is arranged, as shown at $b^5$. A belt, $c^5$, extends from the aforesaid pulley $a^5$ of the roll B', around the aforesaid pulleys of the rolls B'', B⁴, and C'', and over the pulley $b^5$, thereby giving motion to the several rolls, to insure their drawing action in carrying the divided fabrics back from the rolls B B'.

Toward the rear of the machine is a tension-bar, C, the upper edge of which should be in substantially the same horizontal plane as the space $a$ between the straining-bars A A'. Behind the tension-bar C are secondary bars $b$, $b'$, $b''$, and $b^3$, while at the rear of the machine is another bar, $b^4$. Of these the bars $b$ and $b''$ are detachable in order to facilitate the introduction of the fabric to the apparatus.

D is a series of circular knives extending across, substantially, the width of the fabric to be cut, arranged in a line coincident with the space $a$ between the straining-bars A and A', and supported in vertical spindles, all as hereinafter explained.

E is the double pile fabric, composed of the two ground-webs $e$, connected by the pile-threads $e'$, as represented in Fig. 24. This double pile fabric is separated by the knives centrally between the two webs $e$, thus forming two sheets of velvet, plush, or other pile fabric, as the case may be, the two sheets thus formed by the separation of the two webs $e$ being indicated at E' E' in Fig. 24.

In the operation of the apparatus, the double pile fabric E is placed at the rear end of the machine, folded in such manner as to be readily unfolded or unwound, so that it may be passed from the rear to the front of the machine. The said double pile fabric is first passed over the bar $b^4$ and the secondary tension-bar $b^3$, thence downward and under the secondary tension-bar $b''$, thence upward and over the secondary tension-bar $b'$, thence downward and under the secondary tension-bar $b$, and thence upward and over the upper edge of the tension-bar C, being then carried forward through the space $a$ between the straining-bars A and A'.

In order to accomplish the further introduction of the double pile fabric E to the apparatus, there should be attached to the forward end of each of the webs $e$ any suitable fabric—as, for example, canvas or the like—as shown at E'' in Fig. 24, one of these pieces of fabric E'' being carried upward over the angular edge of the straining-bar A', thence over the roller B', thence under the roller B'', thence over the rollers B³ and B⁴, and then brought downward, so that as it further descends it may fall in folds upon a table, C³. In like manner the other of the additional pieces E'' is carried downward and underneath the roller B, thence backward and over the rollers C' and C'', where it is allowed to descend in such manner as to fall in folds upon a platform, C⁴, which may be upon the floor at the base of the machine. The object of these supplemental fabrics is simply to insure the operation of the apparatus upon the double pile fabric at the introductory stage before a sufficient length of such double pile fabric has been divided to enable the divided portions E' to be themselves passed over or around the rollers B and B' and their adjunctive rollers, as hereinbefore explained. This attachment of the supplemental fabrics for such purpose is represented in Fig. 24. In Fig. 4 the corresponding lines may be taken as indicating the divided fabrics when the same have reached a sufficient length for themselves to pass over the said rollers. The studs or teeth of card-clothing, with which the rollers B B', and, when desired, the rollers B'', B³, B⁴, C', and C'', are provided, insure sufficient traction or adhesion to the several rollers to cause the fabrics E' to be drawn, the one downward over the angular edge of the straining-bar A, the other upward over the corresponding edge of the other straining-bar, A', thereby affording a sufficient longitudinal straining to each fiber of the pile c' to enable the same to be quickly and effectually cut or severed by the action of the rotary knives D, the forward movement of the double pile fabric E insuring a successive presentation of the said fibers of the pile c' to the series of knives D, which latter reciprocate in a plane substantially coincident with the middle of the space a. The dragging action of the tension-bars C b b' b'' b³, &c., insures a sufficient tension upon the double pile fabric E between the tension-bar C and the edges of the straining-bars A A' to hold the material under such strain and in such position that, as it is fed forward, the knives will act upon the connecting-pile c' at the middle thereof, thereby leaving one-half of the pile upon each of the separated fabrics E'.

The rolls B and B' have their bearings suitably provided in the frame of the machine, and are geared together, as shown in Fig. 3, by spur-wheels D' D'', of substantially equal diameter, in order that the two rolls B B' may have, to all practical intents and purposes, substantially the same surface speed. The spur-wheel D'' gears into a small pinion, D³, on a secondary shaft, D⁴, which also carries a spur-wheel, D⁵, which in its turn is actuated by a worm, d, on a shaft, E⁴, all as represented in Fig. 3. The shaft E⁴ carries the fast portion a³ of a clutch, E⁵, the jaws of which are shown at a⁴ as projecting from the hub of a loose pulley, e, placed on the shaft E⁴, and from which extends a belt, e', to another pulley, e'', on a counter-shaft, e³, which, by means of beveled wheels e⁴ and e⁵, receives motion from a shaft, f, which carries a pulley, f', which in its turn connects by a belt, f'', with a pulley, f³, on the driving-shaft F of the machine. A lever, g, the upper end of which is pivoted to an arm, g', which forms part of the machine-frame, passes downward through the side of a circumferential groove formed in the fast portion a³ of the clutch E⁵ in such manner that, notwithstanding the rotation of the said portion a³, a vibratory motion given to the lever g will give a longitudinal movement to the said portion a³, to connect or disconnect the same with the arms a⁴, connected with the pulley e, as hereinbefore explained, it being understood that the portion a³ of the clutch aforesaid is connected with the shaft E⁴ by means of the usual spline and groove, (as, for example, a longitudinal spline on the shaft and a groove in the interior of the bore of the clutch and fitting upon said spline on the shaft,) to permit its longitudinal movement simultaneous with its rotary motion. The lower end of the lever g is connected by a rod, g³, with one end of a horizontal elbow-lever, h, (shown enlarged in Fig. 18,) the elbow-lever having its pivot or fulcrum h' upon a horizontal arm, h'', bolted or otherwise rigidly attached to the adjacent post h³ of the frame of the machine. Projecting laterally from the said post is a slotted bracket, h⁴, through which slides the outer extremity of the rod g³, the said bracket serving to support the said end of the rod g³. That end of the elbow-lever h remotest from the rod g³ is so proportioned as to pass through a slot, h⁵, in the lower extremity of an arm, i, which extends downward from a bar, G, placed horizontally at the front of the machine, and supported in and working through guides i', attached to the front of the machine at the ends thereof, so that by giving a longitudinal movement in one direction or the other to the bar G the elbow-lever h is caused to give a longitudinal movement to the rod g³, to actuate the clutch E⁵, to connect or disconnect the shaft E⁴ from the pulley e, according as it is desired to start the rolls B B' in motion or to stop the same. The arms a⁴ and the adjacent end of the portion a³ are so constructed as to interlock or to hold the one upon the other when they are brought together, as herein explained. This may be done by causing the extremities of the arms to catch in notches or recesses, or upon projections provided to the part a³, as shown. The coincident arrangement of the two parts of a chuck to insure the operation of the latter, being well understood in the art of the machinist, needs no specific description in this connection. Upon the rod g³ is a horizontal plate, g⁷, placed obliquely to the length of the said rod, thereby providing an inclined plane, as from g⁸ to g⁹ in Fig. 18, the said inclined plane projecting laterally from the bar g³. Working upon a fixed pivot at i⁷ is a lever, h⁷, the lower end of which is in contact with the inclined plane of the plate g⁷, just hereinbefore described, while the upper end, i⁸, of the said lever constitutes a brake-shoe, so arranged as to be swung toward and away from the shaft E⁴. When the mechanism is operated, as hereinbefore explained, to stop the motion of the parts, the same motion of the rod g³ which effectuates this operation, also, by means of the plate $g^7$, operates the lever $h^5$ to bring its upper or brake portion, $i^8$, against the circumference of the shaft $E^4$ to act as a brake thereon, and consequently to destroy the acquired momentum of the parts, which, if not thus neutralized by the action of the brake, would subject the parts to jar and concussion, and would also tend to continue the movement of the apparatus in such manner as to injure the material. By the use of the brake, therefore, acting simultaneously with the disengaging mechanism I secure an instantaneous stoppage of the parts without injury to the fabrics.

G' is a horizontal bar, the position of which is shown in Fig. 1, and the structure of which is hereinafter explained. The end portions of the said bar G' rest upon bearings $k$, suitably provided at the front of the frame of the apparatus, and so constructed as to support the bar in position. The said bar G' is capable of a reciprocating motion, which is given thereto by a pitman, G'', one end of which is pivoted to the lower end of a spur, $G^3$, the construction of which is hereinafter more fully explained, and which projects downward from the front of the bar G', while the opposite end of the said pitman is attached to a crank-pin, $j$, pivoted to a shaft, $G^4$, which, by means of a bevel-pinion, $j^1$, (indicated in dotted outline in Fig. 1,) gears into a bevel-pinion, $j^2$, on a shaft, $k'$, which is provided with a pulley, $k^1$, as shown in Fig. 2, which, by means of a belt, $k''$, is connected with a pulley, $k^3$, on the driving-shaft F, the latter being provided with suitable fast and loose pulleys, $k^4$ and $k^5$, through which motion may be communicated to said driving-shaft F from any suitable source of power, the said pulleys being provided with a suitable belt-shipper, $A^9$, as indicated in Figs. 2 and 5. The bar $B^9$ (shown in Fig. 5) of said shipper is capable of longitudinal movement to shift the belt, and receives the movement from a vertical lever, $C^9$, which is pivoted at its upper end, as shown in Fig. 1, and at its lower end is pivoted to a horizontal lever, $D^9$, the forward end of which is within reach of the foot of the operator, so as to be easily operated to shift the belt. Projecting downward from the bar G', at the front thereof, are hangers $m$, the lower ends of which afford bearings for a shaft, $n$, which latter carries a series of bevel-pinions, $m'$, which work in vertical planes, and each of which gears into a horizontal bevel-pinion, $n'$, of smaller size, these bevel-pinions $n'$ being attached to the lower ends of the spindles I, which carry the cutters D. These spindles I and their immediate adjuncts are displayed on a larger scale in Figs. 6, 7, 8, and 9.

It will be observed that the rotary knives are driven by gearing which affords a positive motion to the cutters, and which, as determined by actual trial, affords great advantages not hitherto obtained in pile-cutting machinery. Previous to inventing this feature of my said invention, I tried driving the cutters with bands; but whenever the knives became at all dull the bands would slip, and the consequent stoppage of one or more of the cutters would invariably tear a hole in the fabric, thereby spoiling the marketable value of many yards of the material, and nullifying, in a very great degree, the feasibility of profitably manufacturing pile goods or fabrics from the class of material hereinbefore designated as composed of two ground-webs, $c$, connected by an intermediate pile, $c'$. It is therefore of very great importance that the knives should be driven by gearing, as described, inasmuch as by this means I have obviated the difficulties and mischiefs inherent in the use of rotary cutters in pile-cutting machinery as hitherto operated. Furthermore, as hereinafter presently explained, the bearings are of very great length as compared with the diameter of the knives. For example, the bearings of the spindles I are twenty-five per cent. greater in length than the extreme diameter of the cutters D attached thereto. This construction or relative proportion of the bearings of the spindles I to the size or diameter of the cutters enables the latter to be run at a speed hitherto unattained—as, for example, fifteen thousand revolutions per minute—the diameter of the knives for a five-inch spindle-bearing being four inches, thereby giving a cutting speed of more than fifteen thousand feet per minute. This high speed, never practically attained before my said invention, causes a smoother cutting action of the cutters upon the pile, a more rapid operation of the machinery, and a finer result and product, due to the perfection with which the severing of the pile between the double pile fabrics is secured. The high speed thus given to the spindles, with their long bearing, necessitates special means of securing their perfect lubrication. This is secured by means presently herein described, and illustrated in Figs. 6 to 9, inclusive. Furthermore, inasmuch as the entire series of knives must be made to cut in one and the same plane, in order that there may be no inequalities in the length of the severed pile left upon each of the fabrics, provision is required for the separate adjustment of each of the knives upon its spindle, and for this also special provision is made, as represented in the said Figs. 6 to 9, inclusive. The features just hereinbefore indicated are important in their practical utility, and contribute very greatly to the successful realization of practical results in the branch of manufacture to which my said invention relates.

In order that the spindles may be applied in place, the bar G' (shown in cross-section in Fig. 6) is formed in its upper side with cylindrical openings or sockets, one for each spindle. Placed in and extended downward through this socket is a sleeve, I', having at its upper edge a flange, $m''$. In the lower end of this sleeve is provided a stuffing-box, $n''$. Placed upon and axially coincident with the sleeve I' is a cap, I'', the interior of which constitutes a tapering chamber, as represented in Fig. 6. The lower end of this cap I″ is provided with a flange, $n^3$, which, by means of bolts $n^4$, as represented in Fig. 8, is attached to the flange $m''$ of the sleeve I′. Other screws, $n^7$, pass through both of the said flanges and connect them bodily to the bar G′. That portion of the interior of the sleeve I′ adjacent to the stuffing-box $n''$ is made of conical form, as represented at $m^3$ in Fig. 6, which constitutes a conical step for the lower end of the bearing portion $p$ of the spindle I. The said bearing portion of the spindle I corresponds in shape to the conjoined interiors of the sleeve I′ and cap I″—that is to say, its upper portion tapers upwardly to correspond to the shape of the chamber of the cap I″, while its lower portion, except the conical step thereof, is cylindrical, to correspond to the cylindrical sides of the interior of the sleeve I′—saving and excepting this, that at the middle of the cylindrical lower portion aforesaid the said bearing portion is circumferentially recessed, as shown at $p'$, so that an annular space is provided between the said portion $p'$ and the coincident cylindrical sides of the interior of the sleeve I′. At this point there is inserted through one side of the sleeve I′, and also through the adjacent side of the bar G′, a bent tube, $r$, through which oil or like lubricating material may be supplied to the bearing of the spindle, the lubricating material entering the circumferential space just indicated, and thence being diffused throughout the length of the bearing. It is necessary, however, that means should be provided to insure the rising of the oil to that portion of the bearing above the circumferential space just mentioned. This in practice is insured by making a shallow thread-like groove spirally around that portion of the cylindrical part of the bearing portion $p$ which is situated above the recessed part of the bearing portion $p$. This groove is indicated by the heavy black line $r'$ in Fig. 6. Inasmuch as the surface of the interior of the cap I″ must be continuous with that of the sleeve I′, it is necessary that means should be provided for placing the interior of the cap exactly coincident with that of the sleeve. For this purpose the inner end of the cap is provided with a circular flange, $s^4$, which fits into a corresponding rabbet formed around the internal edge of the adjacent end of the sleeve I′, as shown in Fig. 6. The tapering form given to the upper part of the bearing portion of the spindle I and the coincident tapering form given to the interior or chamber of the cap I″ contribute materially to the stability, combined with freedom of rotatory motion, which is necessary to the perfect operation of the spindle I in its relation with the cutter D and other parts of the apparatus, inasmuch as any looseness arising from wear of the parts may be obviated and compensated for by turning down the flat surface of one or the other of the flanges $m''$ or $n^3$, thereby enabling the tapering chamber of the cap I″ to be fastened and fitted more snugly upon the corresponding surface of the upper part of the bearing portion of the spindle. Suitable packing being provided around that portion of the spindle which passes through the stuffing-box $n'''$, the escape of the lubricant hereinbefore referred to is wholly prevented, notwithstanding the high speed at which the spindle itself is driven.

Placed upon the top of the cap I″ is a hood, $d^7$, for the purpose of excluding dust, &c. (See Fig. 6.) The upper end of the spindle I is screw-threaded, as shown at $s$, and screwed thereon are two coincident nuts or bosses, J and J′, one of the said nuts or bosses being provided at its inner side with a central boss, $s'$, which fits snugly into a central hole or opening of the circular cutter D, to afford a bearing to hold the same against radial displacement. The two nuts or bosses J and J′, being brought to the requisite position, are screwed tightly toward each other, thereby gripping the central portion of the cutter D between them, and effectually securing the same in position upon the spindle. The cutter may by this means be vertically adjusted with extreme delicacy—as, for example, to the thousandth part of an inch—by a simple manipulation of the nuts or bosses J and J′, and this facility of adjustment is combined with exceeding strength, firmness, and solidity in the attachment of the cutter to the spindle. In order to insure the retention of the sleeve I′ in place, one side thereof is grooved or recessed, as shown in dotted lines at $r^3$ in Fig. 6, the said groove or recess being arc-shaped in its cross-section. A pin or bolt, $r^4$, is passed through a suitable hole in the front of the bar G′, and being provided at its inner or rearmost portion with a screw-thread is screwed into a corresponding but threaded hole at the opposite side of the said bar G′, the cylindrical or middle portion of the pin or bolt $r^4$ being fitted in the correspondingly-shaped recess $r^3$ in the side of the sleeve I′. The parts being accurately and snugly fitted, the contact of the bolt or pin $r^4$ with the surface of the groove $r^3$ firmly retains the sleeve I′ in its place, and at the same time permits its ready disengagement when for any purpose such disengagement is required.

Inasmuch as great steadiness in the movement of the spindle is necessary, and this would be likely to be impaired by any lateral play of the shaft $n$, which, as hereinbefore described, carries the bevel-pinions $m'$, which give motion to the spindles I, the said shaft is provided with a collar, K, the sides of which are flat and parallel, and which is attached to the shaft $n$ by means of a pointed screw, $k^4$, the point of which enters a conical recess in the adjacent surface of the shaft, as indicated in dotted outline in Figs. 12 and 13. This collar K works freely but snugly between two cheeks, K′, which, like the collar itself, are formed of hardened steel, and which are secured by suitable bolts or otherwise to the downwardly-projecting bracket G×, which is attached to and depends from the bar G', which carries the cutters. The bracket G⁸ is formed of two lateral halves, as represented more clearly in Fig. 13, the said halves being united by a suitable bolt and nut, F⁵. This construction of the bracket G⁸, including its lowermost portion, hereinbefore designated as the spur G⁵, is adopted in order that it may be readily applied in relation with the collar K, and also in order that the cheeks K' may themselves be made of separate pieces of hardened steel fitted into correspondingly-shaped sockets formed by coincident semicircular recesses provided at the coincident inner sides of the two halves of the bracket aforesaid, these cheeks K' being, in fact, carefully-formed steel rings placed in position, as just mentioned, and firmly held in place by means of set-screws G⁷, passed through the adjoining portions of the bracket, and with their conical inner ends forced into correspondingly-shaped recesses provided in the circumferential surfaces of the said cheeks K', as will be more readily understood by reference to Fig. 13. A lubricating-pipe, H⁷, is arranged, as indicated in said Fig. 13, and also indicated in dotted outline in Fig. 12, to conduct lubricating material to the circumference of the collar K, whence it spreads laterally to the joints between the said collar and the cheeks K' to diminish the friction between the circumjacent surfaces of the said parts. The upper part of the bracket G⁸ is recessed, as shown at I⁷, in order to provide room for the bevel-pinion n' of the spindle I of the next adjacent cutter D. The said bracket is also made bifurcated, as shown at the upper part of Fig. 13, in order to provide for its attachment by suitable bolts to the bar G'. The shaft n passes through suitable holes or openings in the cheeks K', so that by this means, without undue friction and without undue complication of parts, any longitudinal movement of the shaft n with reference to the bar G', which, if permitted, would interfere with the accurate relations of the gears m' with the pinions n', is effectually prevented. It is of course to be understood that the shaft n, with its gears m', being supported in bearings depending from the bar G', participates in the longitudinal movement of the said bar. The rotary motion of the shaft n, from which the rotary motion of the cutters D is derived, as hereinbefore explained, is itself obtained by means of a belt, r⁷, which extends from a band-wheel, s⁷, on the driving-shaft F to a pulley, u⁷, on the aforesaid shaft n, as shown in Fig. 3. The pulley u⁷ has its hub laterally prolonged at each end to form journals r⁸, which rest in suitable bearings, s⁸, formed on a horizontal bracket, S⁷, as indicated in Figs. 19 and 20, the hub itself being shouldered at the inner end of each of its journals r⁸, so as to be incapable of lateral motion in the direction of its axis. Internally, the hub is provided with a longitudinal groove, in which fits a correspondingly-shaped spline, w⁷, on the shaft n, so that longitudinal movement of the shaft is permitted simultaneously with its rotation with the pulley u⁷.

Inasmuch as the cutters D, as hereinbefore explained, rotate with great rapidity, reaching a circumferential or cutting velocity of, say, fifteen thousand feet and upward per minute, it follows that they would rapidly become dull, and thereby not only be rendered measurably incapable of continuing their work of severing the pile, but also would be rendered incapable of doing uniform work, inasmuch as the pile severed by the cutter when sharp would differ from that severed by the cutter when dull. In order to obviate this, I provide automatic sharpening devices which act in such relation with the edges of the cutters that they maintain the same of a uniform sharpness, no matter how long the machine may be in operation.

Placed at the front of the machine are two parallel shafts, K² and K³, one above, the other below the front edges of the rotary cutters D— that is to say, those edges of the said cutters which project toward the front of the machine. These shafts K² and K³ are geared together by two spur-pinions, t, arranged at one end of the said shafts, the shafts themselves being supported in suitable journals, t'', provided on short standards u, which extend upward from and are rigidly attached to the ends of the bar G', so that the shafts K² and K³, being carried by the bar G', participate in the reciprocating movement of the latter. One end of the shaft K³ projects beyond the journal t'', and has formed in it a longitudinal spline, u', in order that it may play through a spur-pinion, u'', which is situated within a yoke, u³, which extends vertically upward from the end of a horizontal arm, w, rigidly attached to the adjacent portion of the frame of the machine. The pinion u'' is connected by a train of spur-pinions, u¹ and u⁵, with the spur-wheel D', hereinbefore referred to. As a consequence, the spur-wheel D', as it rotates with the roll B', transmits an increased velocity to the shaft K³, and consequently, also, to the shaft K², these shafts having their rotatory movements, the one above, the other below, the edges hereinbefore specified of the cutters D. The circumferential portions of the cutters are caused to revolve between these shafts, in order that the series of sharpening devices L, placed one series on the upper shaft, K², and the other on the lower shaft, K³, may operate at intervals, respectively, upon the upper and under sides of the circumferential portions or edges of the cutters D, each sharpening device being brought against the adjacent edge of the adjacent cutter during a portion of each revolution of the shaft K² or K³, as the case may be, upon which it is placed.

Inasmuch as the sharpening action of the devices L must be uniform and reliable in character, and applied in such manner as to secure a fine edge without abrupt effect on the cutters, certain conditions in the construction of such sharpening devices must be fulfilled. To thus fulfill those conditions is the object of the construction shown on a larger scale in Figs. 10 and 11, the shaft $K^3$ being selected for these figures, and the direction of the rotation thereof being indicated by the arrow in Fig. 10. To provide for the attachment of each sharpening device to its proper shaft, the latter is notched in one side to form a recess having flat parallel surfaces, as indicated at $a^\times$ in Fig. 11. Placed in this recess is an oblong block, $b^\times$, which in width corresponds to the width of the recess $a^\times$, in which it is placed. This block is itself recessed in its outer side, as shown at $e^\times$, and is provided at its opposite side with a nut, $d^\times$. Extended through the shaft, (in this case indicated by $K^3$,) in a position at right angles to the plane of the bottom of the recess $a^\times$, is a screw-bolt, $f^\times$, the threaded inner end of which extends through the nut $d^\times$ of the block $b^\times$. At the outer end of the screw-bolt $f^\times$ is a flange, $g^\times$, which fits into a recess of corresponding shape formed in the adjacent outer side of the shaft. Placed along the latter and attached thereto by screws $h^\times$, as shown in Fig. 11, is a strip, $i^\times$, of metal, provided with openings, through which the squared outer end, $j^\times$, of each bolt $f^\times$ may project. The strip bears against the outer surfaces of the flange $g^\times$, so that by this means longitudinal movement of the bolt $f^\times$ axial to the shaft is prevented, from which it follows that by applying a wrench or other suitable implement to the squared outer end, $j^\times$, of the bolt $f^\times$, the latter may be turned in one direction or the other, and by such turning will move the block $b^\times$ inward or outward, as the case may be.

$K^\times$ is a spring bent to substantially rectangular form, one end being attached to the inner side of one end of the block $b^\times$, as shown at $l^\times$, while the opposite end, brought within or underneath the opposite end of the block $b^\times$, is free, the spring, as thus constituted and applied, being very delicate or sensitive in its elasticity. Inasmuch as the contact of the rapidly-rotating cutters with the sharpening-surface of the blocks $m^\times$ of the sharpening devices would tend to throw the same laterally in the direction of the movement of the cutters, it is desirable to stay or brace the said blocks $m^\times$ against such lateral thrust. This is done by means of a flat plate, $f^8$, the lower end of which is affixed to the block $b^\times$, while its upper end projects past and in contact with the adjacent side of the lateral surface of the block $m^\times$, the arrangement being such that the said brace $f^8$ holds the said block $m^\times$ against the lateral thrust exerted, as just set forth, by the contact of the rapidly-moving cutter with the sharpening-surface of the block $m^\times$. To the flat outer side of the spring $k^\times$ is attached a segment-shaped piece of light wood, $m^\times$, the arc-shaped surface of said piece $m^\times$ being outermost and having cemented thereto a layer, $n^\times$, of leather, the outer surface of which is provided with any suitable fine abrading or sharpening material applied in the form of paste or otherwise—such, for example, as fine rouge, or other equivalent material or substance. The sharpening devices are arranged, with suitable spaces between them, upon each of the shafts $K^2$ and $K^3$, there being one of said devices above and one below each of the rotary cutters. By turning the screw-bolt $f^\times$, to move inward or outward the block $b^\times$, as occasion may require, the arc-shaped sharpening outer surface of the block $m^\times$ is brought into proper relation with the upper or lower edge portion of the cutter, so that as each shaft revolves it brings the arc-shaped sharpening-surface aforesaid against the adjacent edge portion of the cutter, and inasmuch as the circumferential speed of the cutter is manifold greater than the speed at which the sharpening devices move, it follows that the sharpening-surfaces of the latter are kept in contact with the adjacent circumferential edge of the cutter during a considerable number of revolutions of the latter before the continued revolution of the shaft on which the said sharpening devices are placed carries said devices away from the cutter. The sharpening devices on the one shaft act upon the cutters alternately with those on the other shaft, and by these means an automatic sharpening effect is produced at frequent intervals upon the cutters, which maintains the latter at a uniform degree of sharpness, the edge thereby produced upon each cutter being substantially identical with that produced upon all the others, and continuing the same at one time as another, the said edge, moreover, being kept at such a degree of fineness as to produce the most efficient and rapid work upon the material.

Inasmuch as the continued sharpening of the rotary cutters D gradually diminishes their diameter, it is necessary that provision should be made for readjusting their relations with the straining-bars A and A'—in other words, for regulating their position with reference to the pile to be severed, as the same is presented by the feeding of the double pile fabric between the said straining-bars, and by the separation and movement in opposite directions of the severed fabrics E' E'. Furthermore, inasmuch as the thickness, so to speak, of the double pile fabric will vary according as the pile connecting the two ground-webs C C thereof varies in length—in other words, according to the length of the pile desired to be left upon each of the severed fabrics—it follows that the space between the straining-bars A and A' should be varied according to circumstances. I provide for these contingencies as follows: Projecting upward through the upper part of the straining-bar A, at the extremities thereof, are set-screws $A^\times$, which pass through fixed nuts formed in said extremities of the said straining-bar, with their upper ends bearing against the adjacent under side of the upper straining-bar, A'. By turning the screws $A^\times$ upward to a greater or less degree, the upwardly-projecting portions thereof form stops to limit the approach of the two bars toward each other. Of course, when desired, the set-screws A⁴ may be passed downwardly through the lower portion of the upper straining-bar, A′, with their lower extremities resting upon the upper side of the lower straining-bar, A. Each end of each of the straining-bars A and A′ has formed upon it a vertical tongue, B⁴, as indicated in Fig. 23, these tongues, at the opposite ends of the said straining-bars, being placed in vertical guides C⁴, as represented in Figs. 21 and 23, so that a vertical movement may be given to the said bars. The guides C⁴ are formed upon the inner sides of vertical brackets D⁴, each of which has at or near its middle a rearwardly-projecting plate or extension, E⁴, having in one of its sides a dovetail groove, r⁴, as shown in Fig. 22, by which it is connected to a fixed horizontal guide, F⁴, of dovetail shape in its cross-section, and of such size and contour as to fit snugly into the dovetail groove r⁴ of the extension E⁴ aforesaid, so that each of the brackets D⁴, with its extension E⁴, is capable of horizontal adjustment backward and forward upon the fixed guide F⁴. Upon the extension E⁴ of the bracket D⁴ is provided a laterally-projecting nut, s⁴, through which works the threaded end of a horizontal screw, G⁴.

Adjacent to the rearmost end of the screw G⁴ is a collar, t⁴, which bears against the front side of a fixed sleeve or bearing, t⁴⁴. Upon the extremity of the said screw G⁴, at the opposite side of the bearing t⁴⁴, is placed a collar, u⁴, (more fully represented in Figs. 25 and 26,) the flat inner end of which bears against the opposite side of the fixed sleeve or bearing t⁴⁴, in order to prevent longitudinal movement of the screw G⁴. In order to permit the rotation of the latter within the said collar u⁴, the said screw G⁴ has formed in it a circumferential groove, u⁴⁴, preferably of semi-cylindrical cross-section. Extending through the collar u⁴, in a direction substantially tangential to the circumference of the screw G⁴, is a pin, w⁴⁴⁴, placed in such position that its side projects into the groove u⁴⁴, and thereby prevents the longitudinal movement of the collar u⁴ of the screw G⁴, at the same time permitting the rotation of the latter. The rearmost extremity of the collar u⁴ is preferably recessed, to afford space for the squared rearmost end, x⁴, of the screw G⁴, the said squared rearmost end of said screw permitting the application thereto of a suitable wrench for turning the screw. By thus operating the two screws G⁴, the brackets D⁴ may be moved forward or backward, as occasion requires, to bring the space between the straining-bars A and A′ into the exact position with reference to the series of rotary cutters D required to compensate for any change, as hereinbefore mentioned, in the diameter of the said cutters. Each of the brackets D⁴ is provided at top and bottom with an inwardly-projecting shoulder, w⁴, each of said shoulders having formed in it a vertical nut. Through the said nut, in the upper shoulder w⁴ is passed downward the threaded end of a screw-shaft, H⁴, while passed upward through the corresponding nut, in the lowermost of the shoulders w⁴, is the corresponding end of a similar screw-shaft, I⁴. The said screw-shafts are furnished at their outer ends with suitable hand-wheels or other means by which they may be turned. The screws A⁴, being adjusted to regulate the limit of space between the straining-bars A and A′, as hereinbefore explained, the screw-shafts H⁴ and I⁴ are screwed inward to bear snugly against the outer surfaces of the said straining-bars, and acting in conjunction with the screws A⁴ firmly bind and retain the said straining-bars in place.

It is to be observed that by the use of the system or series of cutters, as distinguished from a single cutter, or simply two cutters closely adjacent, the work of severing the pile-threads is divided among the relatively large number of cutters, and the work thrown upon each is lessened and brought within such limits that the cutters may be readily kept sharp and in condition for the best and most effective cutting action upon the pile-threads; also, that the reciprocating movement of the cutter-carrying bar is materially reduced, so that the jar and inconvenience which would arise from a long stroke to said bar is wholly obviated; also, that as a number of cutters act simultaneously in cutting the pile-threads across, substantially, the width of the fabric, the time required for a given amount of work is but a fraction of what otherwise would be required.

Having thus described my said invention, what I claim as my invention, and desire to secure by Letters Patent, is—

1. The combination of the straining-bars A A′ with the rolls B B′, means for operating said rolls, tension-bar C, arranged with its upper edge substantially in line with the space a between the straining-bars, supplemental tension-bars b b′ b″, &c., arranged behind the bar C, a series or system of circular cutters arranged to rotate coincident with the space a, means for operating said cutters, two series of rollers arranged to co-operate with the rolls B B′ in drawing the double pile fabric to the cutters, and means for operating said series of rollers, all substantially as and for the purpose herein set forth.

2. The combination, with straining-bars, and means, substantially as described, for drawing the double pile fabric to and between the same, of a bar carrying a series or system of circular cutters, D, extending, substantially, the width of the fabric to be cut, arranged opposite to or coincident with the space between the said bars, and gears or toothed pinions attached to the spindles of said cutters, driving-gears arranged to co-operate with the gears or pinions aforesaid, and means for transmitting a reciprocating motion to the cutter-carrying bar, all substantially as and for the purpose herein set forth.

3. The combination of a spindle, I, carrying a circular cutter, D, with a shell or socket for receiving and supporting the bearing portion of said spindle, a stuffing-box at the bottom of said shell or socket, a gear or pinion attached to the lower end of said spindle, projected through the stuffing-box aforesaid, means for driving the said pinion, and a bar, G', for carrying the cutter in due relation to the double pile fabric to be severed, all substantially as and for the purpose herein set forth.

4. The combination of a cutter and its carrying-spindle I, cylindrical as to its lower portion, tapered as to its upper portion, and circumferentially recessed at or near the middle of such cylindrical part, with a shell or socket, cylindrical as to the lower and tapering as to the upper part of its interior, an oil-inlet pipe coincident with the circumferential recess aforesaid, and a bar, G', for carrying the cutter on the spindle in due relation with the double pile fabric to be severed, all substantially as and for the purpose herein set forth.

5. The combination, with the straining-bars A A', and means, substantially as described, for drawing the double pile fabric to and between the same, of the reciprocating bar G', carrying a series or system of circular cutters, extending, substantially, the width of the fabric to be cut, having gears on their spindles, means for reciprocating said bar, a secondary shaft, n, also carried by the bar G', and provided with a series or system of gears or toothed wheels for transmitting a positive or non-slipping rotatory motion to the spindles of the cutters, and means for rotating said shaft, substantially as and for the purpose herein set forth.

6. The combination of a circular cutter, D, and a spindle tapered at its upper part, with a shell or socket composed of an internally-cylindrical flanged sleeve, I', and a cap, I'', having a tapering interior or chamber, and a reciprocating bar, G', arranged to carry the cutter in due relation with the double pile fabric to be severed, all substantially as and for the purpose herein set forth.

7. The combination of a cutter and its carrying-spindle, tapered as to its upper portion, cylindrical as to its lower portion, circumferentially recessed at or near the middle of its said cylindrical portion, and having the thin or thread-like spiral groove $r^3$ above the circumferential recess, with a shell or socket internally cylindrical below and tapered above, and a bar, G', for carrying the cutter on the spindle in due relation with the double pile fabric to be severed, all substantially as and for the purpose herein set forth.

8. The combination of a cutter and its carrying-spindle I, a shell or socket for holding the bearing portion thereof, a bar, G', for supporting and carrying the said shell or socket, and a bolt or pin, $r^4$, extended transversely through the bar G', with its side fitted into a groove or notch formed in one side of the shell or socket, whereby provision is made for retaining the socket securely upon the bar G', as the latter carries the cutter in due relation with the double pile fabric to be severed, all substantially as and for the purpose herein set forth.

9. The combination of the spindle I, cylindrical as to its lower and tapering as to its upper portion, provided at or near the center of its cylindrical part with a circumferential recess, and having at its extremity a screw-thread, s, with a circular cutter, D, nuts J and J', a shell or socket composed of the sleeve I', and cap I'', a stuffing-box, $n''$, at the bottom of the sleeve I', a toothed gear or pinion, $n'$, at the lower projecting end of the spindle, an oil-feeding pipe, r, arranged coincident with the circumferential recess of the spindle, a bar, G', for carrying the circular cutter in due relation with the double pile fabric to be severed, and a bolt or pin, $r^4$, passed transversely through the bar G', with its sides fitted into a notch or recess formed in the adjacent surface of the sleeve I', all substantially as and for the purpose herein set forth.

10. The combination, with the bar G', means for reciprocating said bar, the cutters and the spindles provided with the pinions $n'$, of the secondary shaft n, supported in bearings connected to the said bar G', and provided with gears $m'$, through which a rotary motion is communicated to the spindles of the cutters, means for rotating said shaft, a collar, K, fast upon the shaft n, cheeks K', and the bracket $G^\times$, depending from the bar G', substantially as and for the purpose herein set forth.

11. The combination, substantially as described, of a series or system of sharpening devices corresponding in number with the cutters, with a series or system of circular cutters extending, substantially, the width of the fabric, and a bar arranged to carry the said cutters in due relation with the double pile fabric to be severed, and means for operating the said cutters, all substantially as and for the purpose herein set forth.

12. The combination, with the reciprocating bar G' and the circular cutters carried on said bar G' in due relation to the double pile fabric to be severed, of a shaft supported in suitable bearings upon said bar G', sharpening devices provided on said shaft, and which by the rotation of the said shaft are brought at intervals upon the circumferential or edge portions of the rotary cutters, and means for actuating the said shaft, the cutters, and the bar G', all substantially as and for the purpose herein set forth.

13. The combination, with the reciprocating bar G' and the circular cutters carried by said bar in due relation with the double pile fabric to be severed, of two shafts, $K^2$ and $K^3$, supported in bearings upon the said bar G', means whereby said shafts are geared together for simultaneous rotation in opposite directions, each shaft being provided with sharpening devices, which by the rotation of the two shafts are brought at intervals upon the opposite upper and lower edge portions or edges of the rotary cutters, and means for actuating the cutters, the bar G', and the shafts K² and K³, all substantially as and for the purpose herein set forth.

14. The combination, with the bar G', means for reciprocating said bar, the cutters carried by said bar, and means for rotating the same, of the standards $u$ and the two parallel shafts K² and K³, the latter having its end projected, and formed with a longitudinal spline, $u'$, gear-wheels connecting said shafts, the pinion $u''$, the yoke $u^3$, the wheel D', and means for operating said wheel, gearing, substantially as described, for connecting the pinion $u''$ with the wheel D', and sharpening devices attached to the shafts K² and K³, adapted to be applied at intervals to the upper and lower circumferential portions or edges of the rotary cutters by the rotation of the said shaft, substantially as and for the purpose herein set forth.

15. The combination, with circular cutters and means for rotating the same, of arc-shaped sharpening-blocks $m^×$, springs for supporting said blocks, shafts carrying said blocks, and means for rotating said shafts, all substantially as and for the purpose herein set forth.

16. The combination, with circular cutters arranged to act in due relation with the double pile fabric to be severed, of sharpening devices composed of an adjustable block, $b^×$, an adjusting screw-bolt, $f^×$, a spring, K$^×$, an arc-shaped sharpening-block, $m^×$, and a shaft carrying the said parts and arranged in relation with the cutters to bring the sharpening-blocks in contact with the cutters during a portion of the revolution of said shaft, means for actuating said shaft and the cutters, and means for transmitting movement from one to the other of the shafts K² K³, all substantially as and for the purpose herein set forth.

17. The combination, with a circular cutter and its spindle, means for operating said spindle, and straining-bars, across which the double pile fabric may be strained in opposite directions, of the brace $f^×$, with the block $b^×$, spring K$^×$, block $m^×$, shaft K$^×$, means for connecting block $b^×$ to the said shaft, and means for actuating said shaft, all substantially as and for the purpose herein set forth.

18. The combination, with circular cutters arranged to act in due relation with the double pile fabric to be severed, of a shaft arranged parallel with said cutters, and radially bored to receive bolts $f^×$, the said bolts $f^×$ constructed with flanges $g^×$ and squared ends $j^×$, blocks $b^×$, adjustable by means of the bolts $f^×$, arc-shaped sharpening-block $m^×$, connected with the blocks $b^×$, springs K$^×$, a bar, $i^×$, attached to the shaft, to retain the bolts $f^×$ by bearing against the flanges of the said bolts $f^×$, and means for actuating the cutters and shaft, all substantially as and for the purpose herein set forth.

19. The combination of the following elements, to wit: straining-bars, across which the parts of the double pile fabric may be strained in opposite directions, rolls arranged to draw under tension the said fabrics across the said straining-bars, a series or system of circular cutters, a series or system of sockets for receiving the bearings of the spindles of the cutters, and provided with stuffing-boxes at their lower ends, a reciprocating bar constructed to carry said sockets and cutters, and means, substantially as described, for actuating the said parts in unison, substantially as and for the purpose herein set forth.

20. The combination of the following elements, to wit: straining-bars, across which the parts of the double pile fabric may be drawn in opposite directions, rolls for drawing said parts in opposite directions across said bars, tension-bars for resisting the traction of the aforesaid rolls to duly strain the double pile fabric as it is drawn over the straining-bars, a series or system of circular cutters extending, substantially, the width of the fabric, carried by spindles of length greater than the diameter of the cutters, and means, substantially as described, for actuating the said parts in unison, substantially as and for the purpose herein set forth.

21. The combination of the following elements, to wit: straining-bars, across which the parts of the double pile fabric may be strained in opposite directions, to present the pile under tension to the action of the cutters, a series or system of circular cutters extending, substantially, the width of the fabric, provided with gears for driving the same with a positive or non-slipping motion, sharpening devices for maintaining uniformly keen edges upon the said cutters, a bar arranged to carry the said cutters and gears, and means, substantially as described, for actuating the said parts in unison, substantially as and for the purpose herein set forth.

22. The combination of the following elements, to wit: straining-bars, across which the parts of the double pile fabric may be drawn in opposite directions, means, substantially as described, for varying or adjusting the space between the said straining-bars, a series or system of circular cutters extending, substantially, the width of the fabric, arranged opposite and parallel with the center of said space, means, substantially as described, for straining the parts of the double pile fabric in opposite directions across the straining-bars, and means, substantially as described, for simultaneously rotating the cutters each upon its own axis, and reciprocating said cutters as a series or system, all substantially as and for the purpose herein set forth.

23. The combination of straining-bars A A' with vertical guides for controlling the vertical movement thereof, means, substantially as described, for directing the vertical movement thereof, means, substantially as described, for adjusting and retaining the said straining-bars at varied distances from each other, as required by the exigencies of work, a series or system of circular cutters placed coincident with the space $a$ between said straining-bars, means for rotating said cutters, and means for reciprocating the same, substantially as and for the purpose herein set forth.

24. The combination of a series or system of circular cutters with means for operating said cutters, straining-bars A A', provided at their ends with vertical tongues $B^x$, brackets having vertical guides $C^x$ for receiving said tongues, and means, substantially as described, for adjusting the distance between the said straining-bars, substantially as and for the purpose herein set forth.

25. The combination of straining-bars A A', screws $A^x$, for limiting the distance between the said straining-bars, brackets having nuts $W^x$, and screw-shafts $H^x$ and $I^x$, acting to rigidly hold the said straining-bars in position with reference to each other, substantially as and for the purpose herein set forth.

26. The combination of brackets $D^x$, carrying straining-bars A A', with a series or system of circular cutters placed coincident with the space between said straining-bars, means for operating said cutters, and screws $G^x$, for adjusting said brackets, and consequently the straining-bars, with reference to said cutting device or mechanism, substantially as and for the purpose herein set forth.

27. The combination of the brackets $D^x$, having extensions $E^x$ and nuts $s^x$, and carrying the straining-bars A A', with the screws $G^x$, means, substantially as described, for preventing the longitudinal movement of the said screws, a series or system of circular cutters placed coincident with the space $a$ between said straining-bars, means for rotating said cutters, and means for reciprocating the same, all substantially as and for the purpose herein set forth.

28. The combination of the straining-bars A A', constructed with the vertical tongues $B^x$, with the brackets $D^x$, constructed with the vertical guides $C^x$, shoulders or nuts $w^x$, and nuts $s^x$, the screw-shafts $H^x$ and $I^x$, guides for controlling the backward or forward movement of the brackets, screws $G^x$, for affording such backward and forward movement, and means, substantially as described, for adjusting the space between the straining-bars A A', substantially as and for the purpose herein set forth.

29. The combination of the fixed dovetail horizontal guides $F^x$ with the brackets $D^x$, constructed with extensions $E^x$, having longitudinal grooves corresponding to the guides $F^x$, the screws $G^x$, for moving the extensions $E^x$, and consequently the brackets $D^x$, upon the horizontal dovetail-guides $F^x$, the straining-bars A A', carried by the said brackets, a series or system of circular cutters placed coincident with the space $a$ between said straining-bars, means for rotating said cutters, and means for reciprocating the same, all substantially as and for the purpose herein set forth.

30. The combination, with the brackets $D^x$, having extensions $E^x$, and the guides $F^x$, of the straining-bars, A A', carried by said brackets, the screws $G^x$, and squared ends $x^x$, arranged to give motion to the said brackets, the collar $u^x$, constructed with circumferential grooves $u^{xx}$, the sleeve or bearing $t^{xx}$, and tangential pin $w^{xx}$, passed through the said collar, and with its side inserted in the circumferential groove of the shaft, substantially as and for the purpose herein set forth.

31. The combination, with the rolls B B', the straining-bars, the series or system of cutters arranged coincident with the space between the said straining-bars, and the series of rollers $B''$ $B^3$ $B^4$ and $C'$ $C''$, of the pulleys $a^7$ and $b^7$, the belt $c^7$, means for actuating the rolls B B', and means for actuating the cutters, all substantially as and for the purpose herein set forth.

32. The combination of the rolls B B' and means for actuating said rolls, with straining-bars A A', cutting mechanism arranged coincident with the space between the said straining-bars, means for disconnecting the rolls B B' from the driving or motive power, and means for applying a brake to neutralize the acquired momentum of the rolls simultaneously with the disengagement of the latter from the driving mechanism or motive power, substantially as and for the purpose herein set forth.

33. The combination of straining-bars A A' with cutting mechanism arranged to operate coincident with the space between said bars, rolls B B', means for driving said rolls from the shaft $E^4$, shaft $E^4$, means for driving said shaft, lever $h^7$, rod $g^3$, having the laterally-projecting inclined plane, means for operating said rod, and means operated by said rod for disconnecting the driving means of shaft $E^4$ from said shaft, all substantially as and for the purpose herein set forth.

34. The combination, with the bar G', means for reciprocating said bar, a shaft, $n$, and a series of cutters, said shaft and cutters being carried by said bar, gearing for transmitting motion to said cutters from said shaft, and means for operating said shaft, of a bracket, $G^x$, made in two connected parts and provided with cheeks K', and the collar K on the aforesaid shaft $n$, all substantially as and for the purpose herein set forth.

35. The combination, with a bar, G', means for reciprocating said bar, a series of cutters carried by said bar, a shaft, $n$, mounted in bearings upon the said bar G', and having a spline formed thereon, and gearing for imparting a rotary motion from said shaft $n$ to the cutters, of a pulley, $u^7$, provided with an internal groove for the reception of the spline on the said shaft, fixed bearings for said pulley, and means for operating said pulley, all substantially as and for the purpose herein set forth.

CHARLES COUPLAND.

Witnesses:
THOMAS E. CROSSMAN,
RUDOLF H. RJELLMAN.